Aug. 29, 1933.   G. E. GAUS   1,924,155
ADJUSTABLE WIRE BALE TIE
Filed Dec. 16, 1932
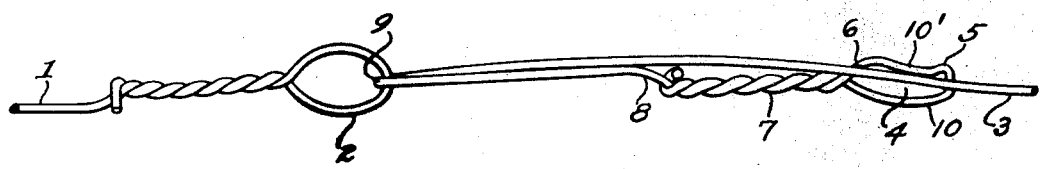
INVENTOR
George E. Gaus
By:
Attorney.

Patented Aug. 29, 1933

1,924,155

UNITED STATES PATENT OFFICE 1,924,155

ADJUSTABLE WIRE BALE-TIE

George E. Gaus, Washington, D. C., dedicated to the free use of the Government and the people of the United States Application December 16, 1932
Serial No. 647,606

2 Claims. (Cl. 24—27)

(Granted under the Act of March 3, 1883, as amended April 30, 1928; 370 O. G. 757)

This application is made under the act of March 3, 1883, as amended by the act of April 30, 1928, and the invention herein described may be manufactured and used by or for the Government for governmental purposes without the payment to me of any royalty thereon.

I hereby dedicate this invention to the free use of the Government and the people of the United States.

My invention relates to that class of bands formed of wire, to be adjusted as to the girth of the baled material, and has for its object to provide a tie of a simple inexpensive construction permitting the tying of the wire without any tools.

My invention also provides an integral locking feature that assures retention of the tie under strain or expansive pressure of the baled material, without the use of buckles or supplemental mechanical devices.

My invention also provides for holding the free or wrap end of the wire in close contact with the baled material, thereby avoiding a protruding end, common to certain types of adjustable wire bale-ties.

My invention also provides a bale tie, or locking feature, being an integral part of the bale wire, capable of being released manually, thereby permitting the removal of the bale wire from the baled material, without altering either the length of the wire or the locking feature of my bale-tie.

My invention further provides, by reason of its peculiar construction, adaptability for subsequent use on other baled material.

By referring to the drawing, which is a perspective view of my bale-tie, bale wire 1 has loop 2 formed in one end, adapted to admit elongated loop 4 formed in wrap end 3. Elongated loop 4 has sides 10 and 10' that freely admit the passage of bale wire 1 between them. Sides 10 and 10' of loop 4 are each bowed upwardly, arising from their junction with twisted portion 7 of wrap end 3, and terminating in curving or recurving depressed crook 5, at the tip end of loop 4. Depressed crook 5, having its sides spaced uniformly throughout of a width slightly larger than the diameter of bale wire 1, snugly accommodates wrap end 3 within its recesses.

Depression 6, accommodating wrap end 3, is fashioned in side 10' of loop 4 adjacent to twisted portion 7 of wrap end 3. Said depression 6 being in alignment with depressed crook 5. Offset 8, in wrap end 3 adjacent to the extremity of twisted portion 7 is slightly greater than the diameter of bale wire 1. Said offset 8 aids in aligning wrap end 3 within depression 6 and crook 5.

Bowed sides 10 and 10' retains wrap end 3 within loop 4, thus controlling the lateral movement of wrap end 3 during the process of tying.

Depressed crook 5 in combination with depression 6 snugly houses wrap end 3 within loop 4, and by means of their subsequent forcible contact with the surface of the bale, form a secure catch for that portion of wrap end 3 enclosed within loop 4.

Offset 8 in wrap end 3, though not absolutely necessary to the successful operation of my locking feature, produces tension in the bowed section of wrap end 3 lying between loop 2 and depressed crook 5 thus materially assisting in the maintenance of wrap end 3 within depressed crook 5 and depression 6 until wrap end 3 is firmly secured within loop 4 by the subsequent strain of the expansive pressure of the baled material against bale wire 1.

In making the tie, herein described, the bale wire is passed around the girth of the bale in the conventional manner. Loop 4, having depressed crook 5 outer-most, is then passed under and through loop 2, and sharply doubled back upon itself forming U-bend 9, having loop 4 adjacent to and at the left of wrap end 3. Loop 4 is then passed beneath wrap end 3. Wrap end 3 is then caused to lie within loop 4 in snug contact with depressed crook 5 and depression 6. Depressed crook 5 and depression 6 being adjacent to the surface of the bale.

When strain is exerted on bale wire 1, due to the expansive force of the baled material, the effect on the wire bale tie is to close U-bend 9 made in wrap end 3 about loop 2, preventing movement and change in the girth of bale wire 1, and to jam wrap end 3 in closer contact with depressed crook 5 and depression 6 within loop 4, thus causing depressed crook 5 to become embedded in the surface of the baled material, thereby preventing lateral motion of my bale-tie and providing secure retention of the ends of the wire bale-tie, precluding possibility of unintentional release of same during the customary handling of the baled material.

The foregoing is a preferred embodiment of my invention and I do not wish, therefore, to be limited to its application, as outlined. I am aware that my invention can be practiced by a variation in the tying of wrap end 3. My invention can be practiced in various ways, and it is, therefore, to be understood that it is the general style of my device that I claim as new and desire to secure by Letters Patent.

I claim:

1. A bale-band for confining bales of varying dimensions formed of a length of wire having one of its ends terminating in a loop, and a cooperating adjustable wrap end terminating in an elongated loop, adapted to be passed through said loop, said elongated loop having means for housing and securing the bale-band.

2. A wire bale tie having one end terminating in a loop, the wrap end of the bale wire terminating in an elongated loop having compressed sides, crook shaped end and a side recessed in alignment with crook shaped end, and adapted to be passed through said loop and to securely engage the wrap end.

GEORGE E. GAUS.